(12) United States Patent
Kochavi et al.

(10) Patent No.: US 11,789,807 B1
(45) Date of Patent: Oct. 17, 2023

(54) AUTONOMOUS MANAGEMENT OF COMMUNICATION LINKS

(71) Applicant: Amazon Technologies, Inc., Seattle, WA (US)

(72) Inventors: Gal Kochavi, Binyamina (IL); Benny Pollak, Yad Binyamin (IL); Sergey Kleyman, Ramat Gan (IL); Itai Avron, Petah Tikva (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/301,254

(22) Filed: Mar. 30, 2021

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0751* (2013.01)

(58) Field of Classification Search
CPC ............... G06F 11/0793; G06F 11/079; G06F 11/0751
USPC ...................................................... 714/1–57
See application file for complete search history.

(56) References Cited

U.S. PATENT DOCUMENTS

| | | | |
|---|---|---|---|
| 7,788,365 B1 | 8/2010 | Foster et al. | |
| 7,974,186 B2* | 7/2011 | Yonezawa | H04L 43/0811 709/227 |
| 9,166,867 B2* | 10/2015 | Gage | H04L 61/25 |
| 2002/0157054 A1* | 10/2002 | Shin | H04L 47/10 714/748 |
| 2003/0058106 A1* | 3/2003 | Ikematsu | H04L 43/0811 370/242 |
| 2003/0200477 A1* | 10/2003 | Ayres | G06F 13/102 719/321 |
| 2005/0034033 A1* | 2/2005 | Nemawarkar | H04L 1/0083 714/52 |
| 2006/0184831 A1* | 8/2006 | Lesartre | G06F 11/3648 714/43 |
| 2007/0208848 A1 | 9/2007 | Bhesania et al. | |
| 2008/0005636 A1* | 1/2008 | Conrad | H04L 1/0045 714/748 |
| 2008/0109707 A1 | 5/2008 | Dell et al. | |
| 2008/0301492 A1* | 12/2008 | Honda | G06F 11/2007 714/E11.128 |

(Continued)

OTHER PUBLICATIONS

U.S. Appl. No. 17/304,593, Kochavi et al., filed Jun. 23, 2021.

(Continued)

*Primary Examiner* — Sarai E Butler
(74) *Attorney, Agent, or Firm* — Weaver Austin Villeneuve & Sampson LLP

(57) ABSTRACT

Systems and methods are disclosed to provide an autonomous management of communication links between dice on a multi-die assembly. Each die can include a detection unit and a controller to detect a failing communication link and perform link maintenance by directing the communication traffic on the failing link to an operational link before the link fails. Once the failing link has been repaired, the controller can re-direct the traffic back to the repaired link. The controllers on each die can negotiate through a handshake process to provide the continuous operation by switching the communication traffic from the failing link to the operational link, and then from the operational link to the repaired link.

20 Claims, 10 Drawing Sheets

(56) References Cited

U.S. PATENT DOCUMENTS

| | | | |
|---|---|---|---|
| 2009/0024883 A1* | 1/2009 | Bethard | H04L 1/22 |
| | | | 714/708 |
| 2010/0161842 A1 | 6/2010 | Shan et al. | |
| 2010/0199017 A1 | 8/2010 | Hollis | |
| 2011/0296215 A1 | 12/2011 | Mobin et al. | |
| 2012/0017121 A1* | 1/2012 | Carlson | H04L 43/16 |
| | | | 714/43 |
| 2012/0079312 A1* | 3/2012 | Muthrasanallur | G06F 11/0793 |
| | | | 714/E11.023 |
| 2012/0216084 A1 | 8/2012 | Chun et al. | |
| 2012/0327940 A1 | 12/2012 | Long | |
| 2013/0097455 A1* | 4/2013 | Chang | G06F 11/0784 |
| | | | 714/3 |
| 2013/0179732 A1* | 7/2013 | Alanis | G06F 11/079 |
| | | | 714/E11.147 |
| 2014/0043957 A1 | 2/2014 | Venkatraman et al. | |
| 2014/0215491 A1 | 7/2014 | Addepalli et al. | |
| 2014/0258790 A1* | 9/2014 | Sorenson | H04L 43/16 |
| | | | 714/48 |
| 2016/0373362 A1 | 12/2016 | Cheng et al. | |
| 2017/0019186 A1 | 1/2017 | Wiley | |
| 2017/0242769 A1* | 8/2017 | Sherlock | G06F 11/0727 |
| 2017/0351628 A1* | 12/2017 | Li | G06F 13/4022 |
| 2018/0198818 A1 | 7/2018 | Andrews | |
| 2018/0302807 A1* | 10/2018 | Chen | H04W 28/0268 |
| 2019/0104424 A1 | 4/2019 | Hariharan et al. | |
| 2019/0303342 A1* | 10/2019 | Jen | G06F 13/4282 |
| 2019/0373526 A1 | 12/2019 | Chow et al. | |
| 2020/0059459 A1 | 2/2020 | Abraham et al. | |
| 2021/0126854 A1* | 4/2021 | Guo | H04L 45/54 |
| 2021/0144050 A1* | 5/2021 | Fagan | H04L 45/28 |
| 2021/0194724 A1* | 6/2021 | Lee | H04J 14/0294 |
| 2022/0109747 A1* | 4/2022 | Mani | H04L 69/323 |

OTHER PUBLICATIONS

U.S. Non-Final Office Action dated Aug. 18, 2022 in U.S. Appl. No. 17/304,593.

U.S. Final Office Action dated Feb. 8, 2023 in U.S. Appl. No. 17/304,593.

"IEEE Standard for Local Area Network MAC (Media Access Control) Bridges," in *ANSI/IEEE Std 802.1D, 1998 Edition*, Dec. 11, 1998, Sect. 6.3.9: Priority (pp. 14-15); Sect. 7.5.1.: Regenerating user priority (pp. 36-37); and Sect. 7.7.3: Queuing frames (pp. 39-40).

U.S. Non-Final Office Action dated Jun. 7, 2023 in U.S. Appl. No. 17/304,593.

\* cited by examiner

AUTONOMOUS MANAGEMENT OF COMMUNICATION LINKS

BACKGROUND

System-on-chips (SoCs) are becoming more complex and bigger in size to meet ever-increasing performance demands. As the SoC die increases in size to support advanced functionalities and communication speeds, manufacturing costs increase, and yields decline. One solution for addressing the cost and complexities of the growing die size is to partition a larger die into smaller interconnected dice (or dies). Splitting the die into multiple smaller dice can improve the fabrication yield and provide better product flexibility. The larger die can be split into smaller dice homogenously or heterogeneously based on the application of the product. However, as the number of dice increase on a multi-chip module, having reliable and fast communication channels among the dice can be a challenging task.

BRIEF DESCRIPTION OF THE DRAWINGS

Various embodiments in accordance with the present disclosure will be described with reference to the drawings, in which.

DETAILED DESCRIPTION

Figure 1:
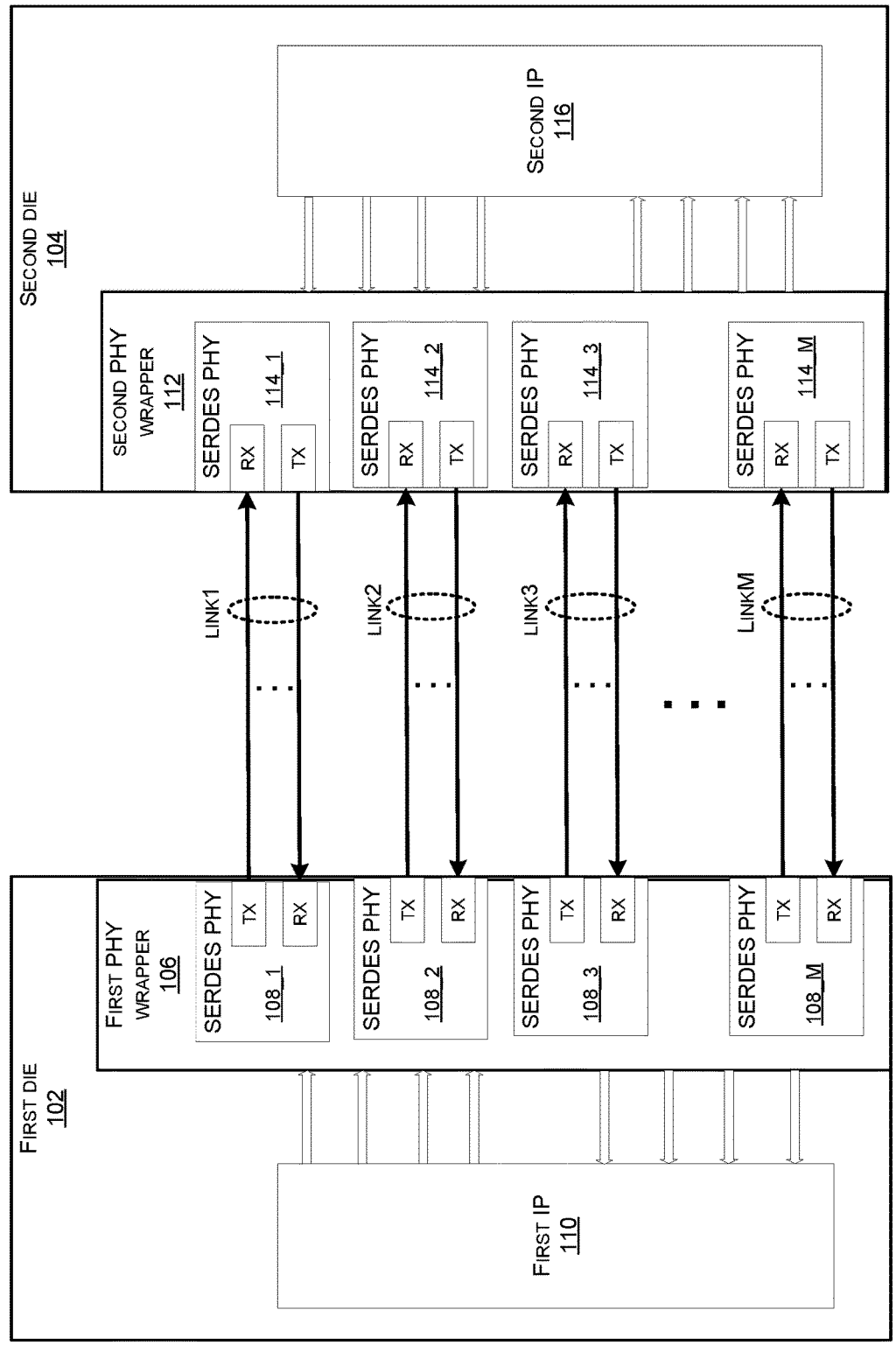
FIG. 1 illustrates a multi-die assembly comprising a first die and a second die for a system-on-chip (SoC)

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Modern day applications relying on artificial intelligence (AI), Internet-of-Things (IoT), networking, cloud computing or high-performance computing, among others, generally demand higher bandwidths and lower latencies to support higher processing speeds and data transfer rates. As the system-on-chip (SoC) die size increases to support complex functionalities and higher communication speeds for data transfer, risk for silicon defects increases, thus affecting manufacturing yield and the production costs. A larger die can be split into multiple dice (or dies) homogenously or heterogeneously to support latest process technologies, more matured technologies, or similar functionalities, which can improve production yield and provide better product flexibility. For example, frequency dependent designs (e.g., processors) can be assembled on one die, and more stable technologies that are cost-optimized for a specific function (e.g., serial bus or memory bus) can be assembled on another die. Multiple dice can be assembled in a single semiconductor chip package such as a multi-chip module (MCM) or a multi-chip package (MCP).

The need for reliable, high speed, and high-quality connectivity for die-to-die communication has risen in order to support proper functioning of the multi-die assemblies. Serializer/De-serializer (SERDES) physical layer (PHY) interface has emerged as a leading approach to provide high speed communication links among multiple dice. A SERDES device can enable transmission between the two dice that use parallel data over serial streams, thus mitigating the number of data paths required for the data transfer as well as reducing the number of connections between the two dice. For example, a SERDES circuit on each die can include a parallel-in-serial-out component to serialize multiple streams of data into a single stream of data for transmitting over a high-speed connection link to another die, and a serial-in-parallel-out component to de-serialize the single stream of data received on the high-speed connection link from the other die. The high-speed connection links between the dice may be based on low-voltage differential signaling (LVDS), current-mode logic (CML), low-voltage positive emitter-coupled logic (LVPECL), or other suitable technology. In certain systems, a plurality of SERDES devices can be used on each die to obtain the desired bandwidth for communication between the dice.

The SERDES devices generally include digital and analog components. An example SERDES device may include reference clock circuits, a phase-locked loop (PLL) circuit, data encoder/decoder, serializers/de-serializers, equalizers, and inputs/outputs (I/Os) for transmission and reception of the serial stream. The analog components of the SERDES devices can be prone to noise from electrical interference, thermal noise, electrostatic discharges, or power supply noise, among other factors, which can cause the communication links to fail frequently. Additionally, use of multiple SERDES devices, higher number of lanes, higher layout density, or extensive use of re-distribution layers to support higher frequencies and higher data rates for the modern-day applications can make the SERDES devices more susceptible to various noises. The frequent failure of the communication links arising from these different factors can be problematic, especially in customer facing applications, which may desire uninterrupted service. For example, the SERDES devices can be used to provide high speed communication links in the underlying hardware for server computers used for high-performance data centers, or cloud computing services. Frequent failure of the SERDES links may in-turn result in poor system performance due to frequent interruptions in the customer-facing applications running on these server computers. Thus, it is desirable to have reliable, and good quality communication links, while maintaining the high bandwidth and low latency requirements for data transfer among the dice.

Embodiments of the disclosed technologies can provide systems and methods to autonomously manage all the communication links in a multi-die assembly to provide continuous operation among the dice despite communication link failures. Each die may include a respective set of SERDES PHY units coupled to the corresponding communication links. Each communication link may comprise two or more lanes to carry communication traffic between the dice. In certain embodiments, each die may also include a link management unit comprising a detection unit and a controller to detect a failing link and perform maintenance of the failing link by directing the traffic on the failing link to an operational link to provide continuous operation. Once the failing link has been repaired, the controller can re-direct the traffic back to the repaired link. The controllers on each die can negotiate through a handshake process to provide the continuous flow of traffic by switching the communication traffic from the failing link to the operational link, and then from the operational link to the repaired link in hardware.

The detection unit on a first die can continuously measure quality of each link by calculating an error rate for each link. In certain embodiments, each die may include one detection unit per SERDES PHY unit to monitor the quality of the communication link corresponding to the SERDES PHY unit. For example, the error rate for a link can be calculated based on number of discarded packets (e.g., packets received with a checksum error) within a pre-determined time period. When the error rate for one or more links exceeds a threshold value, the detection unit can signal to a first controller on the first die indicating that the one or more links are failing. The first controller can communicate with a second controller on a second die coupled to the communications links indicating that the one or more links are failing. The first controller and the second controller can go through a negotiation process to determine which failing link can be disabled for maintenance first. The second controller can then send an acknowledgement to the first controller indicating that a first link from the one or more failing links can be disabled for maintenance. The controller or the detection unit can then initiate a repair process for the first link by communicating with the SERDES PHY unit for the first link on the first die to reset and re-calibrate the first link.

While the first link is being repaired, the first controller can direct the traffic associated with the first link to one or more operational links. Directing the traffic carried by the first link to the operational link(s) before complete failure of the first link occurs can provide un-interrupted operation. In certain embodiments, the operational link(s) can be determined as part of the negotiation process between the first controller and the second controller. The operational links may include a link that may be used to carry communication traffic or may be a spare link that does not normally carry traffic. The detection unit or the SERDES PHY unit with the repaired link can signal the first controller once the first link is repaired. The first controller can again communicate with the second controller indicating that the first link is repaired. The first controller can now re-direct the traffic back to the first link. Thus, pro-actively detecting a failing link and switching from the failing link to an operational link before the communication is interrupted can provide a continuous operation without impacting the system performance. Additionally, certain embodiments can utilize the hardware to perform the autonomous link management thus providing faster results as compared to relying on software intervention.

FIG. 1 illustrates a multi-die assembly 100 (e.g., a single semiconductor chip package) comprising a first die and a second die for a system-on-chip (SoC). Each die can be made of silicon or another suitable semiconductor material, and can be used to host circuits including analog or digital circuits that support different functionalities.

The multi-die assembly 100 may include a first die 102 and a second die 104. The first die 102 may include a first PHY wrapper 106, and a first IP 110. The second die 104 may include a second PHY wrapper 112, and a second IP 116. The first IP 110 or the second IP 116 may include intellectual property (IP) blocks for an integrated circuit including a processor, memory, peripheral, an application specific integrated circuit (ASIC), or a field programmable gate array (FPGA). In one example, the first IP 110 may include a first processor and the second IP 116 may include a second processor. In another example, the first IP 110 may include a processor and the second IP 116 may include a memory. In certain examples, the first IP 110 or the second IP 116 may include a media access controller (MAC). Note that the first die 102 or the second die 104 may include other components based on the functionality of the SoC, which are not discussed here for the ease of simplicity.

Each of the first PHY wrapper 106 and the second PHY wrapper 112 may include a respective set of M SERDES physical layer (PHY) units, which can provide high speed interface for communication between the first die 102 and the second die 104 via a channel. For example, the first PHY wrapper 106 may include a SERDES PHY unit 108_1, a SERDES PHY unit 108_2, a SERDES PHY unit 108_3, and a SERDES PHY unit 108_M. Similarly, the second PHY wrapper 112 may include a corresponding SERDES PHY unit 114_1, a SERDES PHY unit 114_2, a SERDES PHY unit 114_3, and a SERDES PHY unit 114_M. The SERDES PHY unit 108_1 and the SERDES PHY unit 114_1 may be coupled to a communication link1, the SERDES PHY unit 108_2 and the SERDES PHY unit 114_2 may be coupled to a communication link2, the SERDES PHY unit 108_3 and the SERDES PHY unit 114_3 may be coupled to a communication link3, and the SERDES PHY unit 108_M and the SERDES PHY unit 114_M may be coupled to a communication linkM.

In various examples, the first PHY wrapper 106 comprising the M SERDES PHY units and the second PHY wrapper 112 comprising the M SERDES PHY units may be capable to support any serial interface including PCI express, SATA, XAUI, or SAS. Each SERDES PHY unit may include one or more transmitters (TX) and one or more receivers (RX) to communicate with corresponding one or more receivers (RX) and one or more transmitters (TX) on the other die using one or more lanes for a respective communication link. As an example, the number of lanes can be 4, 8, 16, or more based on the implementation. The channel may include connectors, vias, printed circuit board (PCB) traces, or wires to provide an electrical path between each transmitter and receiver. Note that FIG. 1 illustrates an example implementation of the SERDES PHY; however, scope of the disclosure is not limited to a specific implementation of the SERDES PHY.

Each transmitter TX may include a serializer circuit to convert parallel data into serial data, and an input/output (I/O) interface to transmit the serialized data to a respective receiver RX on another die on a respective lane. Each receiver RX may include an I/O interface to receive the serialized data on the respective lane from a respective transmitter on the other die, and a de-serializer circuit to convert the serial data into parallel data. Note that the transmitters and the receivers may also include additional circuits like buffers, latches, FIFOs, multiplexers, de-multiplexers, or connectors based on the implementation.

Each of the first PHY wrapper 106 and the second PHY wrapper 112 may also include circuitry to support the functionality of each SERDES PHY unit, e.g., physical coding sublayer (PCS) units, and clock circuits, which are not shown in FIG. 1 for ease of illustration. The clock circuits may be used to provide clocking for the respective TX and RX interfaces. The clock circuits may include a phase-locked loop (PLL) circuit, reference clock buffers, and any other circuitry. As an example, the PLL circuit may generate a transmit clock that can be used to latch the data into the serializer and can be embedded into the serial stream for transmission via the TX transmitter. The clock circuits may also generate a data recovery clock which can be used to recover the embedded clock received from the transmitting die via the receiver RX. In certain implementations, the clock circuits may utilize a reference clock to generate the TX and RX clocks.

The PCS may be used for translating data to and from the parallel interface, perform data encoding/decoding, symbol alignment, or other suitable tasks. As an example, the PCS may translate parallel data received from the first IP 110 to perform encoding (e.g., 8b/10b encoding) using a high-speed clock generated by the clock circuits. The encoded data can be fed to the serializer of a TX lane for transmitting the serialized data to the second die 104. The PCS may also be used to perform decoding (e.g., 8b/10b decoding) on the parallel data received from the de-serializer of an RX lane using a data recovery clock generated by the clock circuits. The decoded data can be translated to feed the parallel interface of the first IP 110.

In certain implementations, each of the first PHY wrapper 106 and the second PHY wrapper 112 may also include circuitry to provide control signals to the on-chip M SERDES PHY units or receive status signals from the M SERDES PHY units. For example, the control and status signals may include information associated with the links, e.g., link configuration, link reset, link calibration, link status, etc.

In certain examples, each lane between a TX and a corresponding RX may include two wires to support differential signaling for technologies like LVDS. Generally, two or more lanes between a SERDES PHY unit on the first die 102 and a corresponding SERDES PHY unit on the second die 104 can be mapped to a single communication link. For example, a first communication link (e.g., link1) may include the lanes between the SERDES PHY unit 108_1 and the SERDES PHY unit 114_1, and a second communication link (e.g., link2) may include the lanes between the SERDES PHY unit 108_2 and the SERDES PHY unit 114_2. The lanes for each SERDES PHY unit may include digital and analog circuits. The analog circuits can be generally prone to failure due to various factors including intrinsic noise sources (e.g., design errors, faulty components, internal noise, poor electrical connections, etc.) or extrinsic noise sources (e.g., electrostatic discharges, power supply noise, thermal noise, electrical interference, etc.). Due to these factors, one or more communication links between the first die 102 and the second die 104 might fail, thus interrupting the normal operation of the SoC.

Generally, the normal operation of the SERDES PHY devices may include an error detection and recovery process. For example, an error detection and correction technique such as checksum, forward error correction (FEC) or cyclic redundancy check (CRC) can be built-in to the SERDES devices to minimize a bit-error-rate (BER) for each link. For example, the BER (or simply the error rate) can be calculated based on the number of bits received incorrectly as compared to the number of bits transmitted. In the normal operation, when an error is detected in a packet received by a receiver that was transmitted by a transmitter over a communication link, a request can be sent to the transmitter to resend the packet. However, in certain instances, the resent packet may also be lost or discarded due to a failing link, thus, increasing the error rate. The link failure may in-turn lower the system performance by interrupting the customer-facing applications running on the server computers relying on these high-speed links. Thus, it is desirable to have reliable and good quality communication links, while maintaining the high-speed requirements for data transfer among the dice.

Embodiments of the disclosed technologies can provide systems and methods to autonomously manage all the communication links in a multi-die assembly to provide uninterrupted communication among the dice, as described with reference to FIGS. 2A and 2B.

Figure 2A:
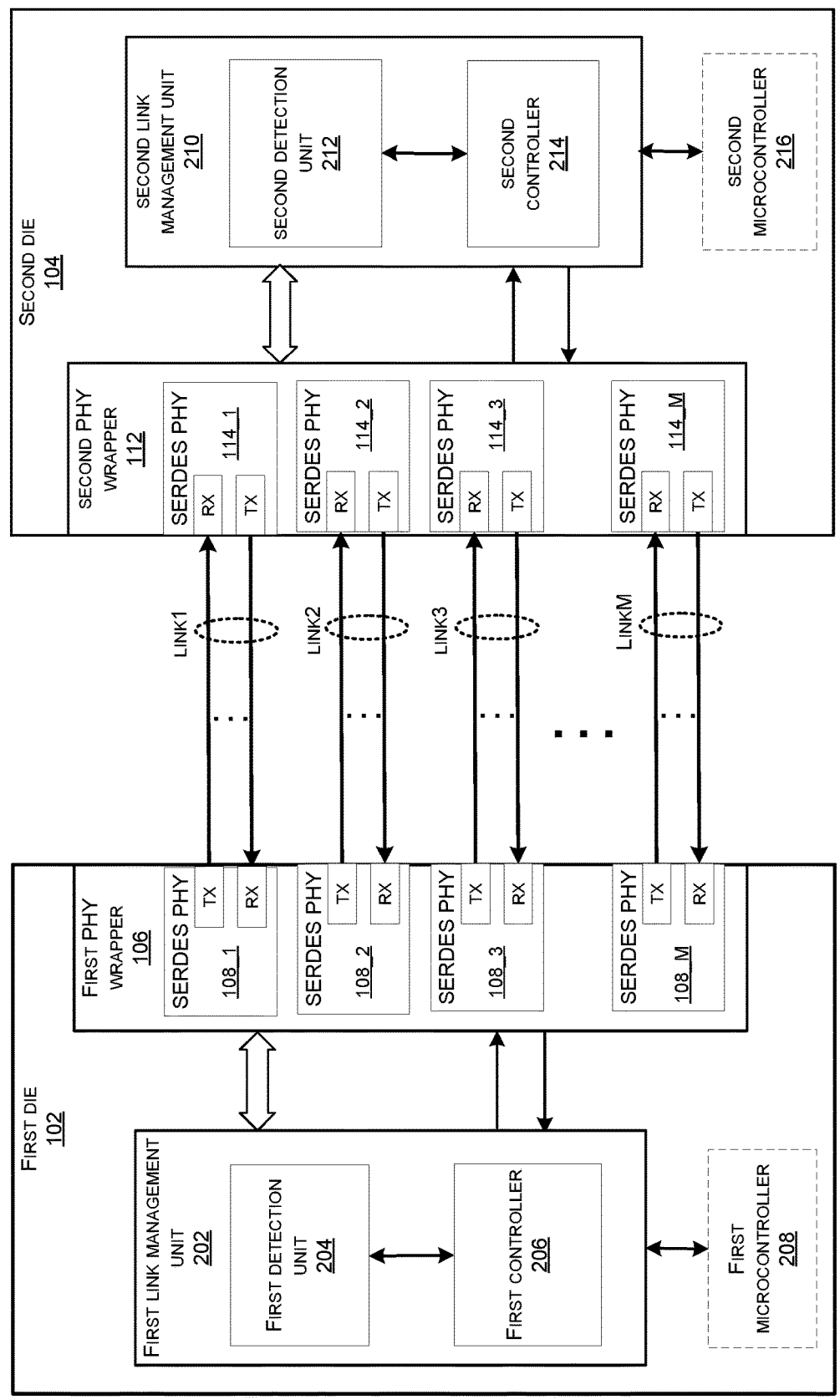
FIG. 2A illustrates a multi-die assembly comprising a first link management unit comprising a detection unit coupled to a controller on a first die, and a second link management unit comprising a detection unit coupled to a controller on a second die, which can autonomously manage communication links between the first die and the second die, in certain embodiments.

FIG. 2A illustrates a multi-die assembly 200 comprising a first link management unit comprising a detection unit coupled to a controller on a first die, and a second link management unit comprising a detection unit coupled to a controller on a second die, which can be used to autonomously manage communication links between the first die and the second die, in certain embodiments. The first link management unit and the second link management unit can include integrated circuits.

As shown in FIG. 2A, the first die can be the first die 102, and the second die can be the second die 104 from FIG. 1. The first die 102 may include the M SERDES PHY units 108_1-108_M and the second die 104 may include the M SERDES PHY units 114_1-114_M, as discussed with reference to FIG. 1. The multi-die assembly 200 may be part of an SoC and may include other components based on the functionality of the SoC. The first die 102 and the second die 104 may communicate with each other using M links comprising a link1, a link2, a link3, and a linkM corresponding to the SERDES PHY units 108_1-108_M on the first die 102 and the SERDES PHY units 114_1-114_M on the second die 104. Each of the M links may comprise one or more lanes as discussed in FIG. 1.

Each die in the multi-die assembly 200 may include a link management unit comprising a detection unit and a controller to autonomously detect a failing link, direct the communication traffic carried by the failing link to an operational link while the failing link is being repaired, and re-direct the communication traffic back to the repaired link once it is operational. In certain embodiments, the first die 102 may include a first link management unit 202 comprising a first detection unit 204 and a first controller 206, and the second die 104 may include a second link management unit 202 comprising a second detection unit 212 and a second controller 214. The first link management unit 202 may be configured to communicate with each of the M SERDES PHY units 108_1-108_M, and the second link management unit 210 may be configured to communicate with each of the SERDES PHY units 114_1-114_M. The first PHY wrapper 106 may include circuitry to communicate with the first link management unit 202, and the second PHY wrapper 112 may include circuitry to communicate with the second link management unit 210, which are not shown in FIG. 2A.

In certain embodiments, the first link management unit 202 may be configured to communicate with an optional first microcontroller 208, and the second link management unit 202 may be configured to communicate with an optional second microcontroller 216. The first microcontroller 208 or the second microcontroller 216 may be configured to execute firmware to perform certain operations associated with the M SERDES PHY units 108_1-108_M or the M SERDES PHY units 114_1-114_M, respectively. For example, each microcontroller can be used to configure, reset, or initiate training, calibration or re-calibration process of the respective SERDES PHY units.

The detection unit on each die can be used to continuously measure quality of each of the M links in real time to determine if any of the links is failing by comparing the quality of each link with a quality metric. The quality of the link can be determined using an error rate (e.g., the BER) that can be calculated based on a count of discarded packets in a pre-determined time period. The error rate may increase when the count of the discarded packets within the pre-determined time period increases, thus lowering the quality of the link. The detection unit may keep track of the number of discarded packets over time and calculate the error rate by performing statistical calculations in real time using the count of the discarded packets and any other relevant factors. Generally, when the error rate is low, the receiver of the SERDES PHY may request the transmitter to re-send the packets received with errors to continue normal operation. However, in certain instances, the error rate may continue to increase due to various intrinsic or extrinsic noise factors, as discussed previously.

When the count of the discarded packets transmitted or received over a link becomes more than a threshold value, the detection unit may detect that the quality of the link is decreasing and determine that the link is failing. A link may be considered failed when it cannot transfer a certain number of packets within a pre-determined time period. As an example, a count of the discarded packets within one second may be two for an operational link, and ten for a failed link. The threshold value can be set to six so that the error rate will exceed the threshold value for a link whose quality is decreasing but hasn't completely failed yet. For example, when the count of the discarded packets crosses six, it may indicate that the link quality is low, and the link is failing. Thus, the detection unit can determine a probability of a link to fail in the near future based on the error rate so that appropriate actions can be taken by the controller before the link fails to provide continuous operation of the system.

In certain embodiments, upon detecting that the error rate for one or more communication links is higher than a threshold value, the detection unit may send one or more link status signals to the controller indicating that the one or more communication links are failing. An example link status signal for a link may include a link identifier (e.g., a link number), status of the link (e.g., failing, operational, or disabled), link quality (e.g., based on a scale or percentage), and/or link bandwidth. In certain embodiments, the controllers on each die may monitor the status of each communication link as reported by the respective detection units. Upon receiving the link status signals indicating that one or more links are failing, the controllers on both dice may negotiate with each other to determine which link can be disabled or shut down for maintenance and identify an operational link for carrying the traffic of the failing link. The controllers on both dice can perform a handshake to direct the communication traffic on the failing link to the operational link. The handshake may be performed by exchanging control and acknowledgement packets between the two controllers. Note that the handshake between the controllers can be performed using any suitable protocol, without deviating from the scope of the disclosure.

After sending the link status signals, the detection unit may initiate a repair process to repair the failing link. In certain embodiments, the controller can initiate the repair process. The repair process may include sending a control signal to the corresponding SERDES PHY unit indicating a request to reset and re-calibrate the failing link. Once the failing link has been reset and re-calibrated, the SERDES PHY unit may send a status signal to the detection unit or the controller indicating that the re-calibration of the disabled link has completed. In certain implementations, the re-calibration process may include sending a test pattern (e.g., one or more training packets) on the link to adjust the timing of the frames on both ends of the link. Once the link has been repaired, the detection unit can then send an updated link status signal to the controller indicating that the disabled link is operational again. For example, the link status may indicate the status of the link as the operational status and updated quality of the link. The controllers can perform another handshake to re-direct the communication traffic from the operational link to the repaired link.

As an example, the first controller 206 may receive the link status signals from the first detection unit 204 indicating that one or more links are failing. In certain embodiments, the first detection unit 204 may provide a respective link status signal for each link to the first controller 206. For example, the first detection unit 204 may provide M link status signals to the first controller 206. An example of the link status signal may include a link ID, a status of the link (e.g., failing, operational, disabled), link quality (e.g., low, medium, high), and/or the link bandwidth.

The first controller 206 may communicate with the second controller 214 to indicate that one or more links are failing by sending a first control packet to the second controller 214 via any of the SERDES PHY units. For example, each control packet may include a link ID for each link, a transmitting die ID, a packet ID, a packet type ID, and/or any other relevant information. The packet type ID may be used to indicate the type of the packet, e.g., synchronization message, failing link message, repaired link message, among others. The second controller 214 may receive the first control packet via the corresponding SERDES PHY unit and determine which link out of the one or more failing links can be disabled for maintenance. In certain embodiments, the second controller 214 and the first controller 206 may negotiate with each other to determine the link that can be disabled or shut down for maintenance. In certain examples, the second controller 214 may compare for each failing link, the link quality, or the type of communication traffic they are carrying to prioritize the link that needs maintenance first. For example, the second controller 214 may determine that link1 needs to be maintained first. The second controller 214 can then send a first acknowledgement packet to the first controller 206 via the SERDES PHY unit with an acknowledgement that link1 is to be disabled for maintenance. An example first acknowledgement packet may include a transmitting die ID, a packet ID (e.g., the first acknowledgement packet), a packet type ID (e.g., an acknowledgement), and/or any other relevant information.

In certain embodiments, the first controller 206 may identify an operational link based on the status of all the links, and optionally the link quality or the link bandwidth from the link status signals to direct the communication traffic associated with link1 to the operational link. For example, the first controller 206 may choose a certain link if the link is operational, quality of the link is close to a maximum level, and/or the bandwidth of the link can allow carrying additional traffic. As an example, the first controller 206 may identify link2 as the operational link to carry the traffic associated with link1. In certain embodiments, the operational link to carry the traffic for link1 can be determined during the negotiation process with the second controller 214 after the second controller 214 receives the first control packet.

In some embodiments, the second controller 214 may send the first acknowledgement packet after the negotiation process. For example, the first acknowledgement packet may also include information associated with the link that can be disabled and the operational link that can carry the traffic for the disabled link. Another example first acknowledgement packet may include the transmitting die ID, the packet ID (e.g., the first acknowledgement packet), the packet type ID (e.g., an acknowledgment), an ID for the disabling link, an ID for the operational link, or any other relevant information. The ID for the disabling link can be the ID for link1 as negotiated by the controllers. The ID for the operational link can be the ID for link2. The second controller 214 may then prepare to direct the communication traffic associated with the disabling link to the operational link. In certain examples, more than one link can be disabled at the same time for maintenance based on the availability of the operational links, quality of each link, or available bandwidth of each link, among other factors.

Upon receiving the first acknowledgement packet from the second controller 214, the first controller 206 may direct the communication traffic associated with the failing link (e.g., link1) to the operational link (e.g., link2). The first controller 206 may communicate with the SERDES PHY unit 108_1 and the SERDES PHY unit 108_2 to direct the traffic being carried by the failing link1 to the operational link2. For example, the first controller 206 may send a signal to the SERDES PHY unit 108_1 to initiate a repair process of link1. The first controller 206 may also send a signal to the SERDES PHY unit 108_2 to prepare for carrying the communication traffic that was being carried by the SERDES PHY unit 108_1. For example, switching the traffic from one link to another link may require synchronization between the corresponding SERDES PHY units on the first die 102 and the SERDES PHY units on the second die 104 using control frames or other known synchronization techniques, which are not discussed here.

Once the communication traffic carried by link1 is directed to link2, the SERDES PHY unit 108_1 can initiate a repair process to repair link1. The repair process may include performing a reset and re-calibration of link1. In certain embodiments, the first detection unit 204 may send a request to the SERDES PHY unit 108_1 to initiate the repair process. For example, the first detection unit 204 may send a repair signal to the SERDES PHY unit 108_1 including an operation (e.g., maintenance) to be performed. The SERDES PHY unit 108_1 may reset link1 and perform re-calibration of link1 using a suitable protocol. In certain examples, the SERDES PHY unit 108_1 may perform a test sequence on link1 to determine whether link1 is operational (e.g., send a test pattern and check if the test pattern is received back correctly). Once link1 is operational, the SERDES PHY unit 108_1 may send a maintenance status signal to the first detection unit 204 or the first controller 206 indicating that the re-calibration of link1 has completed and/or link1 has been repaired. The first detection unit 204 may optionally send a second link status signal to the first controller 206 indicating that link1 has been repaired and is operational. The second link status signal may include the link ID, status of the link (e.g., operational), link quality (e.g., high), and/or link bandwidth.

The first controller 206 may communicate with the second controller 214 to indicate that link1 is repaired upon receiving the maintenance status signal or the second link status signal. For example, the first controller 206 may communicate with the second controller 214 to indicate that link1 is repaired by sending a second control packet to the second controller 214 via any of the SERDES PHY units. The second control packet may include information to indicate that link1 has been repaired so that the communication traffic on link2 can be re-directed back to link1. For example, the second control packet may include the link ID for link1, the transmitting die ID for the first die 102, the packet ID to indicate the second control packet, the packet type ID to indicate the repaired link1, or any other relevant information. The second controller 214 may receive the second control packet via the corresponding SERDES PHY unit and determine that link1 is repaired based on the contents of the second control packet. The second controller 214 may send a second acknowledgement packet to the first controller 206 via the SERDES PHY unit. The second acknowledgement packet may include information associated with an acknowledgement of receipt of the second control packet. For example, the second acknowledgement packet may include the transmitting die ID, the packet ID (e.g., the second acknowledgement packet), the packet type ID (e.g., an acknowledgement), and/or any other relevant information.

Upon receiving the second acknowledgement packet from the second controller 214, the first controller 206 may re-direct the communication traffic from link2 to link1. For example, the first controller 206 may communicate with the SERDES PHY unit 108_2 and the SERDES PHY unit 108_1 to re-direct the traffic being carried by the SERDES PHY unit 108_2 to the repaired SERDES PHY unit 108_1. Note that switching the traffic back to link1 from link2 may require synchronization between the corresponding SERDES PHY units on the first die 102 and the SERDES PHY units on the second die 104 using control frames or other known synchronization techniques, as discussed previously.

In certain embodiments, some portions of the link management process that may not require a fast turnaround time or are not time-critical can be handled by software. For example, to maintain a continuous flow of the communication traffic, switching of the links from the failing link to the operational link, and then from the operational link to the repaired link can be handled by the hardware (e.g., the controllers) in a quick manner before the failing link breaks down. However, the maintenance portion of the link management may be relatively less time-critical, and therefore can be handled by the software. For example, in certain embodiments, the first detection unit 204 or the first controller 206 may send a request to the first microcontroller 208 to handle the repair process of the failing link. The first microcontroller 208 can interact with the SERDES PHY unit associated with the failing link to perform the repair process and inform the first detection unit 204 or the first controller 206 once the link has been repaired.

In certain embodiments, each die may include one detection unit per SERDES PHY unit to monitor the quality of the link coupled to that SERDES PHY unit. This is discussed with reference to FIG. 2B.

Figure 2B:
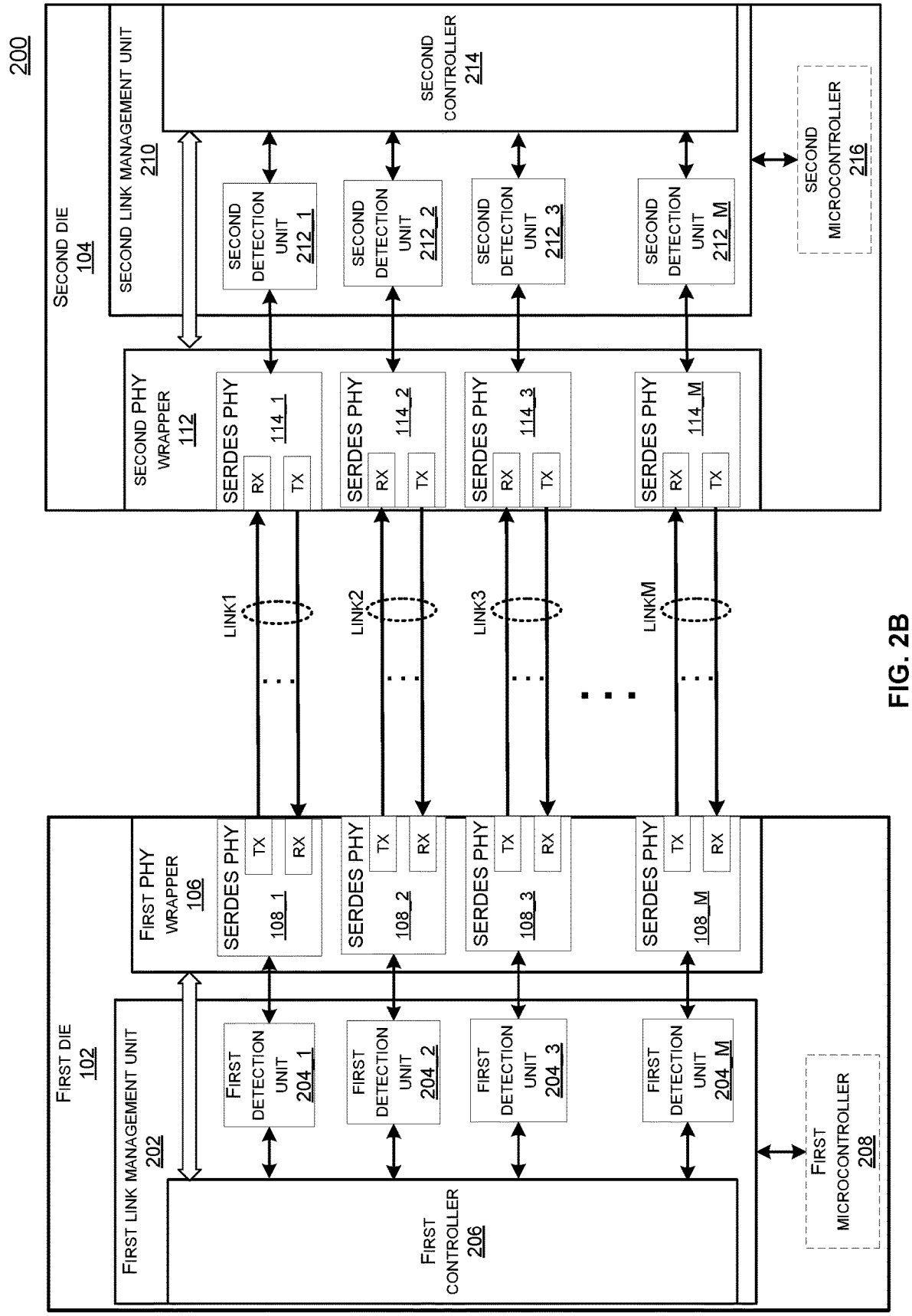
FIG. 2B illustrates a multi-die assembly comprising a first link management unit comprising multiple detection units coupled to a controller on a first die, and a second link management unit comprising multiple detection units coupled to a controller on a second die, which can autonomously manage communication links between the first die and the second die, in certain embodiments.

FIG. 2B illustrates the multi-die assembly 200 comprising a first link management unit comprising multiple detection units coupled to a controller on a first die, and a second link management unit comprising multiple detection units coupled to a controller on a second die, which can autonomously manage communication links between the first die and the second die, in certain embodiments As shown in FIG. 2B, one detection unit per SERDES PHY unit for each die can be used to continuously measure quality of the link coupled to the SERDES PHY unit to determine if the link is failing by comparing the quality of the link with a quality metric. The quality of the link can be determined using the error rate for that link that can be calculated as discussed with reference to FIG. 2A. As an example, the first detection unit 204 may include M first detection units for the M SERDES PHY units 108_1-108_M, and the second detection unit 212 may include M second detection units for the M SERDES PHY units 114_1-114_M. A first detection unit 204_1 may be coupled to the SERDES PHY 108_1 and the first controller 206, a first detection unit 204_2 may be coupled to the SERDES PHY 108_2 and the first controller 206, a first detection unit 204_3 may be coupled to the SERDES PHY 108_3 and the first controller 206, and a first detection unit 204_M may be coupled to the SERDES PHY 108_M and the first controller 206. Each of the first detection units 204_1-204_M may be configured to monitor the quality of a respective link coupled to the corresponding SERDES PHY unit from the SERDES PHY units 108_1-108_M, and communicate with the first controller 206 upon detecting a link failure, as described with reference to FIG. 2A for the first detection unit 204.

Similarly, a second detection unit 212_1 may be coupled to the SERDES PHY unit 114_1 and the second controller 214, a second detection unit 212_2 may be coupled to the SERDES PHY unit 114_2 and the second controller 214, a second detection unit 212_3 may be coupled to the SERDES PHY unit 114_3 and the second controller 214, and a second detection unit 212_M may be coupled to the SERDES PHY unit 114_M and the second controller 214. Each of the second detection units 212_1-212_M may be configured to monitor the quality of a respective link coupled to the corresponding SERDES PHY unit from the SERDES PHY units 114_1-114_M, and communicate with the second controller 214 upon detecting a link failure, as described with reference to FIG. 2A for the second detection unit 212.

Figure 3:
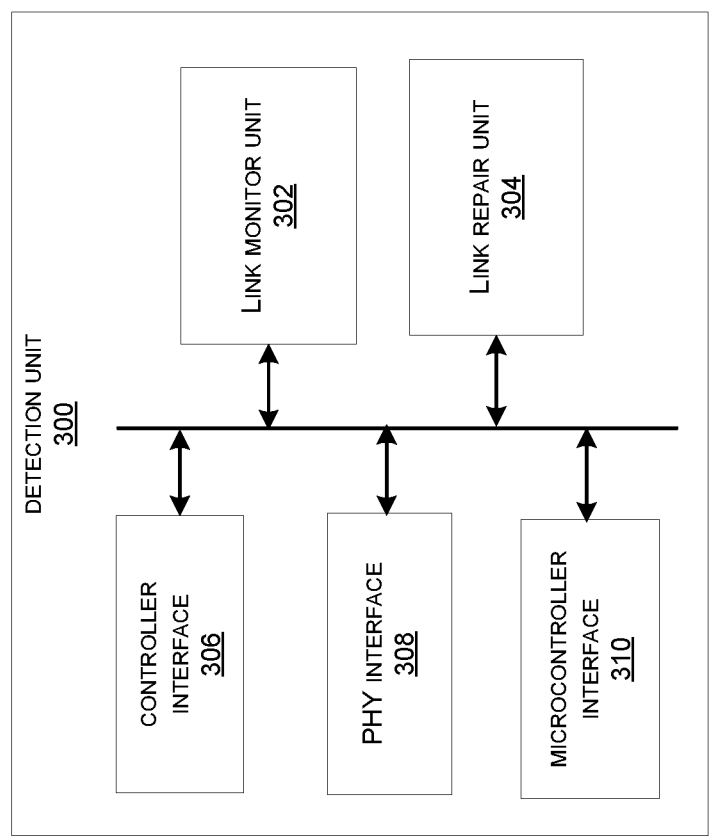
FIG. 3 illustrates example components of a detection unit, which can be used to implement certain embodiments.

FIG. 3 illustrates example components of a detection unit 300, which can be used to implement certain embodiments. The detection unit 300 can be implemented using an integrated circuit. The detection unit 300 can represent an example implementation of any of the first detection units 204_1-204_M or the second detection units 212_1-212_M, as discussed with reference to FIG. 2A. The detection unit 300 may comprise a link monitor unit 302, a link repair unit 304, a controller interface 306, a PHY interface 308, and a microcontroller interface 310.

The link monitor unit 302 may monitor the SERDES PHY link coupled to the detection unit using the PHY interface 308 to continuously measure quality of the link in real time. For example, the link monitor unit 302 may compare the quality of the link with a quality metric to determine if the link is failing. The quality of the link can be determined based on an error rate. The link monitor unit 302 may calculate the error rate by performing statistical calculations in real time by keeping a count of the discarded packets over the link within a pre-determined time period by communicating with the SERDES PHY unit using the PHY interface 308. The error rate may increase when the count of the discarded packets within that time period increases, thus lowering the quality of the link. In certain embodiments, the link monitor unit 302 may store information associated with the link, which can be used to generate the error rate over a pre-determined period of time. For example, the link monitor unit 302 may use registers, buffers, or other suitable memory to store the information associated with the link.

The controller interface 306 may be used to generate one or more link status signals to be sent to the controller to indicate the status of the link. In certain examples, the controller interface 306 may generate the link status signals based on the information provided by the link monitor unit 302 for the link. An example link status signal for a link may include a link ID (e.g., a link number), status of the link (e.g., failing, operational, or disabled), link quality (e.g., based on a scale or percentage), and/or link bandwidth. The link status signals may be updated as the operational status of a link changes between failing, disabled or operational.

The link repair unit 304 may be used to initiate a repair process for a failing link. The repair process may include sending a request to the SERDES PHY unit for the failing link via the PHY interface 308 to perform maintenance on the failing link. The SERDES PHY unit may reset and re-calibrate the failing link to perform the maintenance. For example, the re-calibration process may include sending a test pattern (e.g., one or more training packets) on the link to adjust the timing of the frames on both ends of the link. Once the SERDES PHY unit has reset and re-calibrated the failing link, the SERDES PHY unit may send a signal to the link repair unit 304 via the PHY interface 308 indicating that the re-calibration process is completed, and the failing link has been repaired. The link monitor unit 302 can update the status of the link once it is repaired. In certain embodiments, the request to initiate the repair process may be sent by the controller and the link repair unit 304 may not be used.

The microcontroller interface 310 can be used optionally by the on-chip microcontroller to perform certain tasks related to the link management. For example, in certain embodiments, for systems that are not time critical, instead of the hardware, the link repair process can be managed by firmware executed by the microcontroller.

Figure 4:
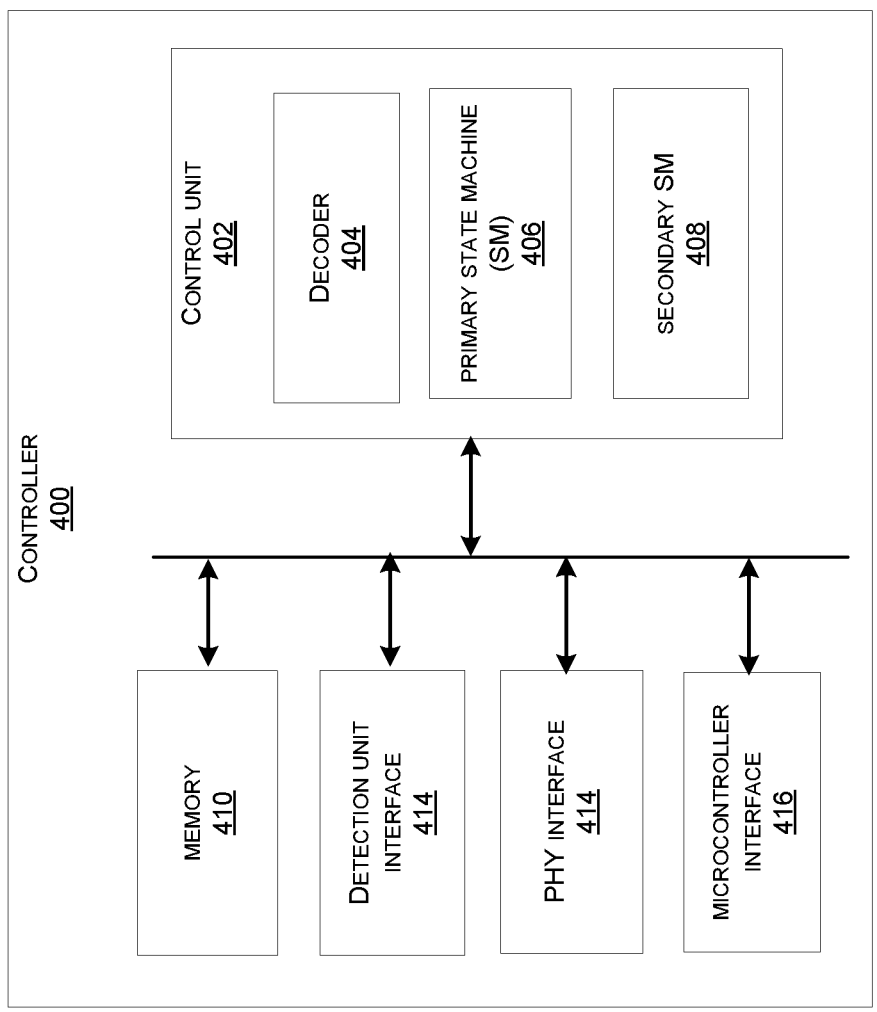
FIG. 4 illustrates example components of a controller, which can be used to implement certain embodiments.

FIG. 4 illustrates example components of a controller 400, which can be used to implement certain embodiments. The controller 400 can be implemented using an integrated circuit. The controller 400 can represent an example implementation of the first controller 206 or the second controller 214, as discussed with reference to FIGS. 2A and 2B. The controller 400 may include a control unit 420, memory 410, a detection unit interface 412, a PHY interface 414, and a microcontroller interface 416. The control unit 402 may comprise a decoder 404, a primary state machine (SM) 406, and a secondary SM 408. The primary SM 406 and the secondary SM 408 can be implemented in hardware using combinatorial logic, gates, flip-flops, registers, latches, or other circuits.

The detection unit interface 412 may be used to exchange control signals with the detection unit 300. For example, the controller 400 can receive the link status signals from the detection unit 300 to determine that a link is failing, or a link has been repaired.

The PHY interface 414 can be used to exchange data and control signals with the on-chip M SERDES PHY units. The controller 400 can communicate with each of the M SERDES PHY units on the die via the PHY interface 414 to direct the traffic from the failing link to the operational link, and from the operational link to the repaired link. The PHY interface 414 can also be used to generate and transmit the control packets and the acknowledgement packets based on the signals generated by the primary SM 406 and the secondary SM 408. The PHY interface 414 can also be used to receive the control packets and the acknowledgement packets from the other controller via the SERDES PHY unit. For example, each control packet may include a link ID for each link, a transmitting die ID, a packet ID, a packet type ID, and/or any other relevant information. Each acknowledgement packet may include a transmitting die ID, a packet ID, a packet type ID, and/or any other relevant information. In certain embodiments, the controller 400 may include a separate PHY interface to communicate with each SERDES PHY unit on the die. In certain embodiments, the repair process of a failing link is managed by the controller instead of the detection unit. For example, the PHY interface 414 can be used to communicate with a SERDES PHY unit to initiate a repair process for a failing link, and receive a signal from the SERDES PHY unit once the link has been repaired.

The memory 410 may include registers, latches, flip-flops, SRAM, DRAM, or other suitable memory. The memory 410 can be used to store state variables associated with the primary SM 406 and the secondary SM 408, and any other data.

The decoder 404 can decode signals received from the detection unit 300 or any of the SERDES PHY unit, and provide control signals to the primary SM 406 and the secondary SM 408. For example, the decoder 404 may decode one or more link status signals received from the detection unit 300 via the detection unit interface 412, to generate the control signals for the primary SM 406 and the secondary SM 408. Similarly, the decoder 404 may decode the acknowledgement packets received from the other controller via the PHY interface 414 to generate the control signals for the primary SM 406 and the secondary SM 408.

The primary SM 406 can monitor the status of all the links on the first die and negotiate with a secondary SM on the second die to determine the failing link that can be disabled for maintenance and direct the traffic on the failing link to an operational link. The primary SM 406 can also communicate with a secondary SM of a second controller on the other die, once the failing link has been repaired, to re-direct the traffic back to the repaired link. For example, the primary SM 406 of the first controller 206 can communicate with a second SM of the second controller 214 to negotiate which link can be disabled and synchronize directing the traffic from the disabled link to the operational link, and then from the operational link to the repaired link. The primary SM 406 may receive control signals from the decoder 404 based on the status of all the links and communication with the second SM of the second controller 214. An example of the primary SM 406 is discussed with reference to FIG. 5.

The secondary SM 408 can communicate with a primary SM of the second controller on the second die to negotiate which link can be disabled and synchronize directing the traffic from the disabled link to the operational link, and then from the operational link to the repaired link. For example, the secondary SM 408 of the first controller 206 can communicate with a primary SM of the second controller 214. An example of the secondary SM 410 is discussed with reference to FIG. 6.

Figure 5:
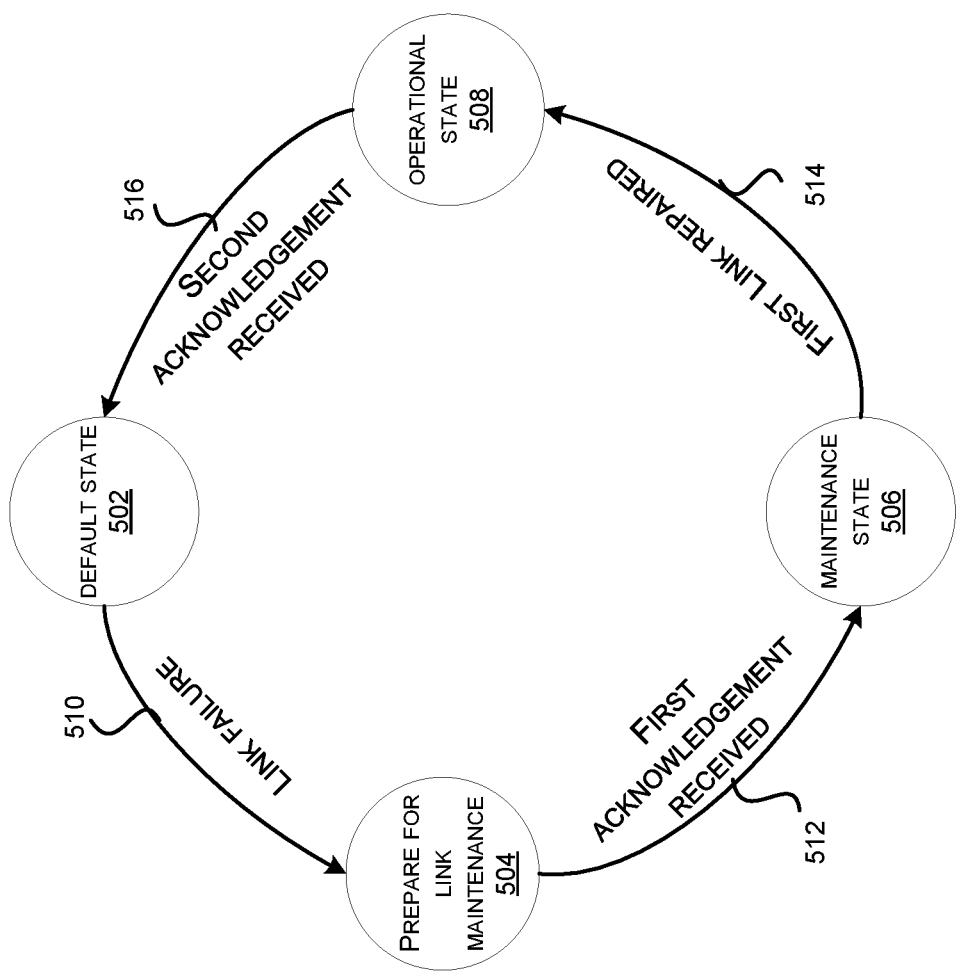
FIG. 5 illustrates an example primary state machine (SM) for a controller, which can be used to manage the links between the two dice to provide continuous operation, according to certain embodiments.
Figure 6:
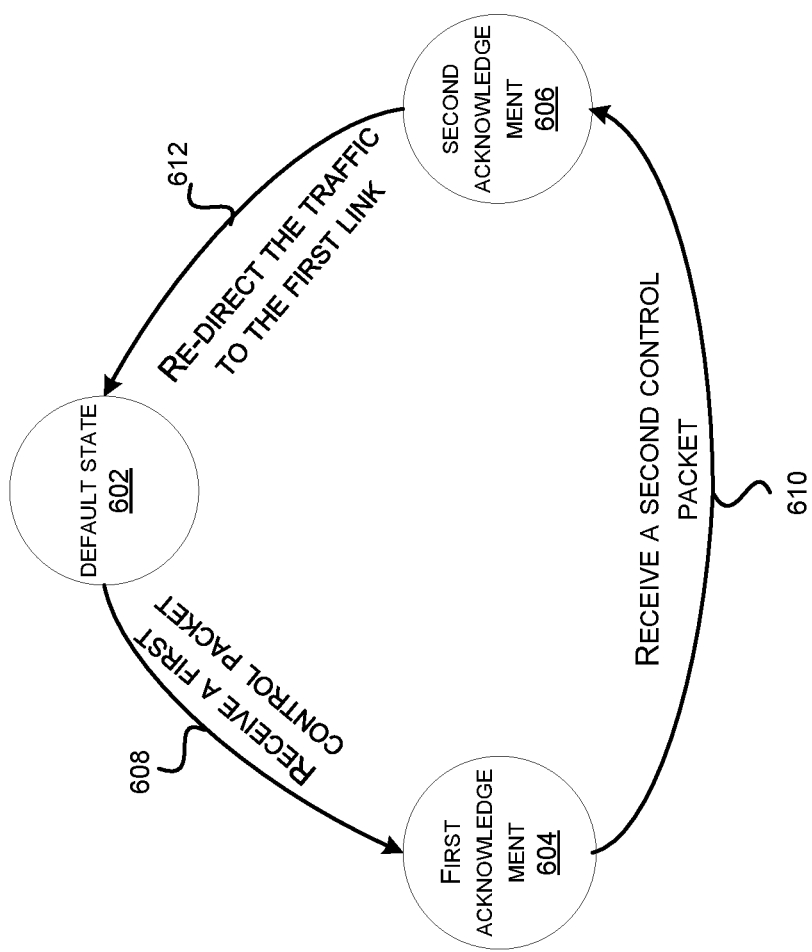
FIG. 6 illustrates an example secondary SM for a controller, according to certain embodiments.

FIG. 5 and FIG. 6 illustrate an example primary SM 500 and an example secondary SM 600, respectively, for a controller, which can be used to manage the links between the two dice to provide continuous operation, according to certain embodiments. For example, the primary SM 500 can be the primary SM 406 for the first controller 206, and the secondary SM 600 can be the secondary SM 408 for the second controller 214. Alternatively, the primary SM 500 can be the primary SM 406 for the second controller 214, and the secondary SM 600 can be the secondary SM 408 for the first controller 206. Note that both the first controller 206 and the second controller 214 may execute the respective primary SM 500 and the secondary SM 600 simultaneously; however, for discussion purposes, communication between the primary SM 500 on the first die 102 and the secondary SM 600 on the second die 104 has been described.

The primary SM 500 can be in a default state 502 and the secondary SM 600 can be in a default state 602 when all the links between the first die 102 and second die 104 are operational. For example, the link status signals from the first detection unit 204 or the first detection units 204_1-204_M may indicate that all the links are operational based on the respective quality of each link. The primary SM 500 can move to a next state 504 upon receiving a link failure signal from the decoder 404. The link failure signal may be generated by the decoder 404 from the link status signals received from the first detection unit 204, or one or more first detection units 204_1-204_M which detected the failing link(s). The link failure signal(s) may indicate that one or more links are failing.

When the primary SM 500 is in the state 504, the first controller 206 can prepare for maintenance of the failing links. Preparing for the maintenance may include negotiating with the second controller 214 to determine which of the failing links can be disabled and to direct the communication traffic associated with the failing link to one or more operational links. For example, the first controller 206 can send a first control packet to the second controller 214 indicating that one or more links are failing. The decoder 404 in the second controller 214 may decode the first control packet which can send a signal 608 to the secondary SM 408 to move to state 604. In certain embodiments, the negotiation process between the two controllers may also include agreeing on one or more operational links for carrying the communication traffic associated with the failing link.

The secondary SM 408 of the second controller 214 may move to the state 604 upon receiving the signal 608. In this state, the secondary SM 214 may determine which of the failing links can be disabled first for maintenance. In certain embodiments, the second controller 214 may determine which link out of the failing links can be disabled first based upon types of the communication traffics carried by the failing links, a comparison of respective qualities of the failing links, or any other suitable criteria. For example, if link1 and link3 are failing, the second controller 214 may determine that link1 can be disabled based on the type of the communication traffic (e.g., mission critical) carried by link1, or the quality of link1 being worse than the quality of link3. The second controller 214 may send an acknowledgement packet to the first controller 206 with the acknowledgement that link1 is to be disabled for maintenance. In certain embodiments, the second controller 214 may send the acknowledgement packet to the first controller 206 after the operational link for carrying the communication traffic of link1 has been identified as part of the negotiation process.

Referring back to FIG. 5, the acknowledgement packet may be received by the first controller 206 and decoded by the decoder 404 to generate a signal 512. The primary SM 500 may move from the state 504 to a maintenance state 506 upon receiving the signal 512. In the maintenance state 506, the first controller 206 may direct the communication traffic of link1 to an operational link2 by synchronizing switching of the communication traffic with the second controller 214. For example, the SERDES PHY unit 108_2 and the SERDES PHY unit 114_2 may execute relevant synchronization protocols to enable switching of the communication traffic of link1 to link2. The first controller 206 may initiate a repair process to repair link1 and the first controller 206 may continue in the maintenance state 506 while link1 is being repaired. Similarly, the secondary SM 408 may continue in the state 604 while link1 is being repaired. For example, the repair process may include sending a request to the SERDES PHY unit 108_1 to perform maintenance on link1. The SERDES PHY unit 108_1 may reset and re-calibrate link1 to perform the maintenance. Once the SERDES PHY unit 108_1 has reset and re-calibrated the failing link1, the SERDES PHY unit 108_1 may send a signal to the first controller 206 indicating that the re-calibration process is completed, and the failing link1 has been repaired.

Once link1 is repaired, the first detection unit 204 may send an updated link status signal to the first controller 206 indicating that link1 is repaired. In certain examples, the SERDES PHY unit 108_1 may send a link status signal to the first controller 206 indicating that link1 is repaired. The decoder 404 in the first controller 206 may decode the updated link status signal and generate a link repaired signal 514. The primary SM 500 can move to an operational state 508 upon receiving the link repaired signal 514. In the operational state 508, the first controller 206 can prepare to re-direct the traffic back to link1 from link2. The first controller 206 can send a second control packet to the secondary SM 408 indicating that link1 has been repaired so the traffic can be re-directed back to link1. The decoder 404 in the second controller 214 may decode the second control packet and send a signal 610 to the secondary SM 408 indicating that link1 has been repaired.

Referring back to FIG. 6, the secondary SM 408 of the second controller 214 may move to a state 606 upon receiving the signal 610. In this state, the second controller 214 may send a second acknowledgement packet to the first controller 206 indicating the receipt of the second control packet. Sending the second acknowledgement packet may initiate the process to re-direct the traffic back to link1, as indicated by a signal 612.

Referring back to FIG. 5, the second acknowledgement packet may be received by the first controller 206 and decoded by the decoder 404 to generate a signal 516. The first controller 206 and the second controller 214 can synchronize re-directing the traffic back to link1 from link2 and move to their respective default state. For example, the SERDES PHY unit 108_1 and the SERDES PHY unit 114_1 may execute relevant synchronization protocol to switch the communication traffic back to link1 from link2. Once the traffic has been re-directed, the primary SM 500 can be in the default state 502 and the secondary SM 600 can be in the default state 602, where all the links are operational.

Figure 7:
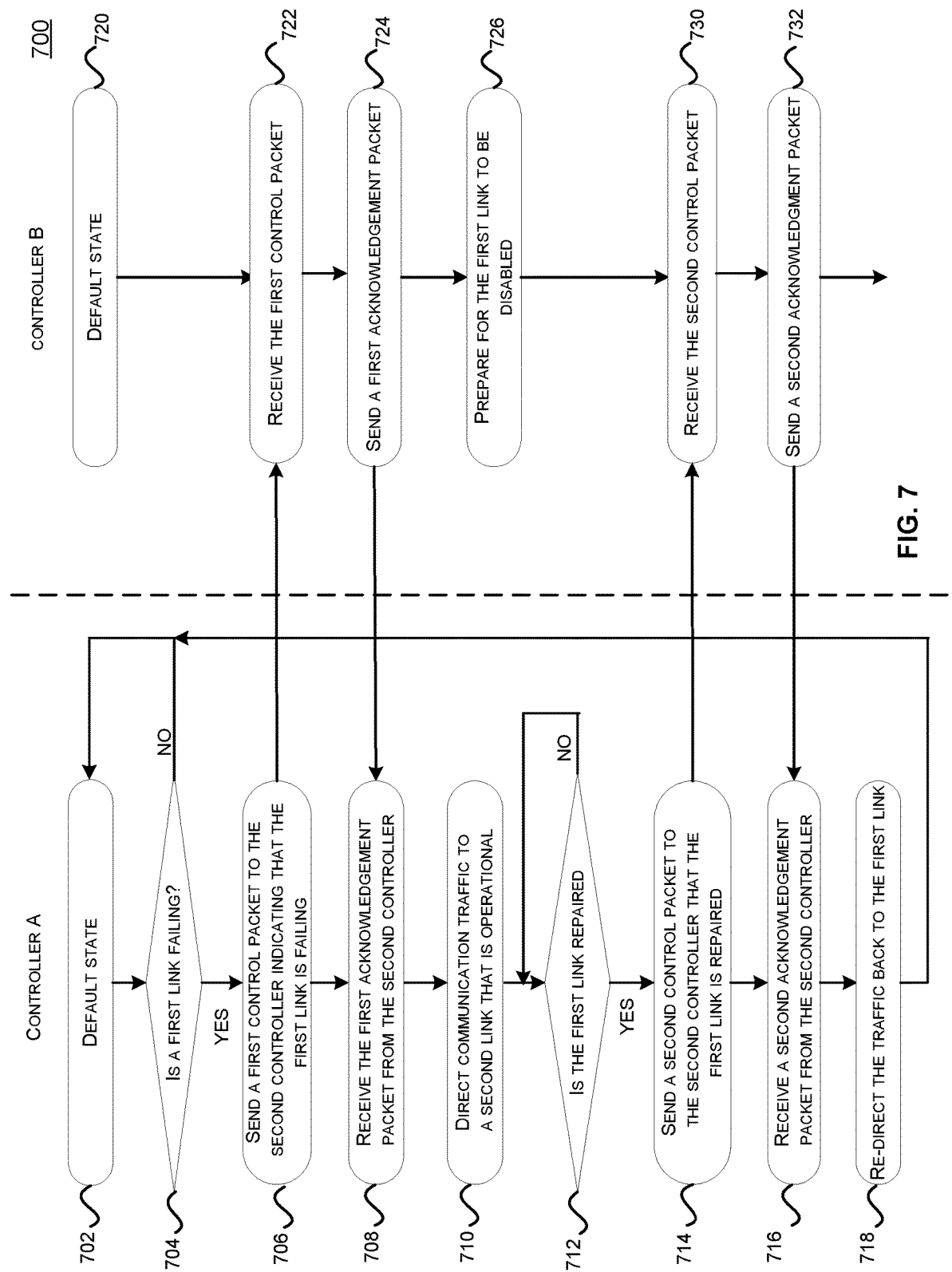
FIG. 7 illustrates communication between a first controller and a second controller to perform autonomous link management according to certain embodiments.

FIG. 7 illustrates communication between a controller A and a controller B to perform autonomous link management according to certain embodiments. The controller A can be the first controller 206 or the second controller 214, and the controller B can be the second controller 214 or the first controller 206, respectively. However, for discussion purposes, communication between the first controller 206 as the controller A, and the second controller 214 as the controller B is discussed.

In step 702, the controller A may be in a default state indicating that all the links are operational. For example, the primary SM 406 for the first controller 206 and the secondary SM 408 for the second controller 214 may be in their respective default states. The links may include the M links coupled to the SERDES PHY units 108_1-108_M on the first die 102 and to the SERDES PHY 114_1-114_M on the second die 104.

In step 704, the controller A may determine that a first link is failing. For example, the first detection unit 204 (or the first detection units 204_1-204_M) may monitor all the M links on the first die 102 to continuously measure quality of each of the links and may detect whether an error rate for communication traffic on any of the links is higher than a threshold value. As discussed with reference to FIG. 3, the link monitor unit 302 for the first detection unit 204_1 may determine that link1 is failing when the error rate for communication traffic on link1 exceeds the threshold value. The controller interface unit 306 may generate a link status signal indicating that link1 is failing and send it to the first controller 206. For example, the link status signal may include information to indicate a link ID for link1, the status of the link as failing, the link quality as low, and the link bandwidth as 80%. Note that if more than one links are failing, the controller interface unit 306 may generate a separate link status signal for each link including information to indicate the respective values.

In step 706, the controller A may send a first control packet to the controller B indicating that the first link is failing. The first controller 206 may send the first control packet to the second controller 214 via any of the SERDES PHY units 108_1-108_M. For example, the first control packet may include a link ID for link1, the transmitting die ID for the first die 102, the packet ID to indicate the first control packet, the packet type ID to indicate a failing link, or any other relevant information. The first control packet may be sent on link1 (if link1 has not completely failed) or another link from the M links. As discussed with reference to FIG. 5, the primary SM 406 may transition to the state 504 from the default state 502 to prepare for the maintenance of link1 upon receiving the signal 510 indicating that link1 is failing. Preparing for the maintenance of link1 may include negotiating with the second controller 214 to determine whether the failing link1 can be disabled. In certain embodiments, the negotiation process may also be used to determine the one or more operational links that can carry the communication traffic associated with link1 while link1 is being repaired.

In step 722, the controller B may receive the first control packet via the corresponding SERDES PHY unit. As discussed with reference to FIG. 6, the first control packet may be received by the second controller 214 using the PHY interface 414 and the contents of the first control packet can be decoded by the decoder 404 to generate the signal 608 indicating that link1 is failing. The secondary SM 408 of the second controller 214 may transition to the state 604 from the default state 602 upon receiving the signal 608.

In step 724, the controller B may be in the state 604. In this state, the second controller 214 and the first controller 206 may negotiate with each other to determine whether link1 can be disabled for maintenance. If the second controller 214 agrees with disabling link1, the second controller 214 may send a first acknowledgement packet to the first controller 206 via the corresponding SERDES PHY unit with the acknowledgement that link1 can be disabled for maintenance. The first acknowledgement packet can be generated by the PHY interface 414 of the second controller

214. The first acknowledgement packet may include the transmitting die ID for the second die 104, the packet ID, the packet type ID (e.g., acknowledgement), and/or any other relevant information.

In step 726, the controller B may prepare for link1 to be disabled. For example, the second controller 214 may store data associated with the communication traffic on link1 to facilitate the transfer to an operational link while link1 is being repaired.

In step 708, the controller A may receive the first acknowledgement packet from the controller B. Upon receiving the first acknowledgement packet, the primary SM 500 for the first controller 206 may move from the state 504 to the maintenance state 506 based on the signal 512 derived from the first acknowledgement packet.

In step 710, the controller A may direct the communication traffic from link1 to one or more operational links. As an example, the first controller 206 may identify link2 from one or more operational links for carrying the traffic of link1 based on the quality of the links, available bandwidth, type of communication traffic, and any other criteria based on the link status signals. In the maintenance state 506, the first controller 206 may direct the communication traffic of link1 to link2 in synchronization with the second controller 214. Once the communication traffic for link1 switches to link2, the first controller 206 may initiate the repair process by sending a request to the SERDES PHY unit 108_1 to repair link1.

In step 712, the controller A may wait in the maintenance state 506 while link1 is being repaired. The first controller 206 may receive an updated link status signal from the first detection unit 204 or the SERDES PHY unit 108_1 once link1 repaired. For example, the updated link status signal may include information to indicate the link ID for link1, the status of the link as operational, the link quality as high, and the link bandwidth as 100% to indicate that link1 is repaired. The decoder may generate the signal 514 from the updated link status signal, which may trigger the primary SM 500 to transition from the maintenance state 506 to the operational state 508.

In step 714, the controller A can send a second control packet to the controller B indicating that link1 has been repaired. For example, the second control packet may include the link ID for link1, the transmitting die ID for the first die 102, the packet ID to indicate the second control packet, the packet type ID to indicate the repaired link1, and/or any other relevant information.

In step 730, the controller B may receive the second control packet. The secondary SM 408 of the second controller 214 may move to the state 606 upon receiving the signal 610 derived from the second control packet indicating that link1 has been repaired.

In step 732, the controller B may send a second acknowledgement packet to the controller A indicating the receipt of the second control packet. For example, the second acknowledgement packet may include the transmitting die ID for the first die 102, the packet ID (e.g., the second acknowledgement packet), the packet type ID (e.g., an acknowledgement), and/or any other relevant information. Sending the second acknowledgement packet may initiate the process to re-direct the traffic back to link1.

In step 716, the controller A may receive the second acknowledgement packet sent by the controller B.

In step 718, the controller A may re-direct the communication traffic back to link1 upon receiving the second acknowledgement packet. The first controller 206 and the second controller 214 can synchronize re-directing the traffic back to link1 from link2 and move to their respective default state. For example, the SERDES PHY unit 108_1 and the SERDES PHY unit 114_1 may execute relevant synchronization protocols to switch the communication traffic back to link1 from link2. Once the traffic has been re-directed, the primary SM 500 can be in the default state 502 and the secondary SM 600 can be in the default state 602, where all the links are operational.

Figure 8:
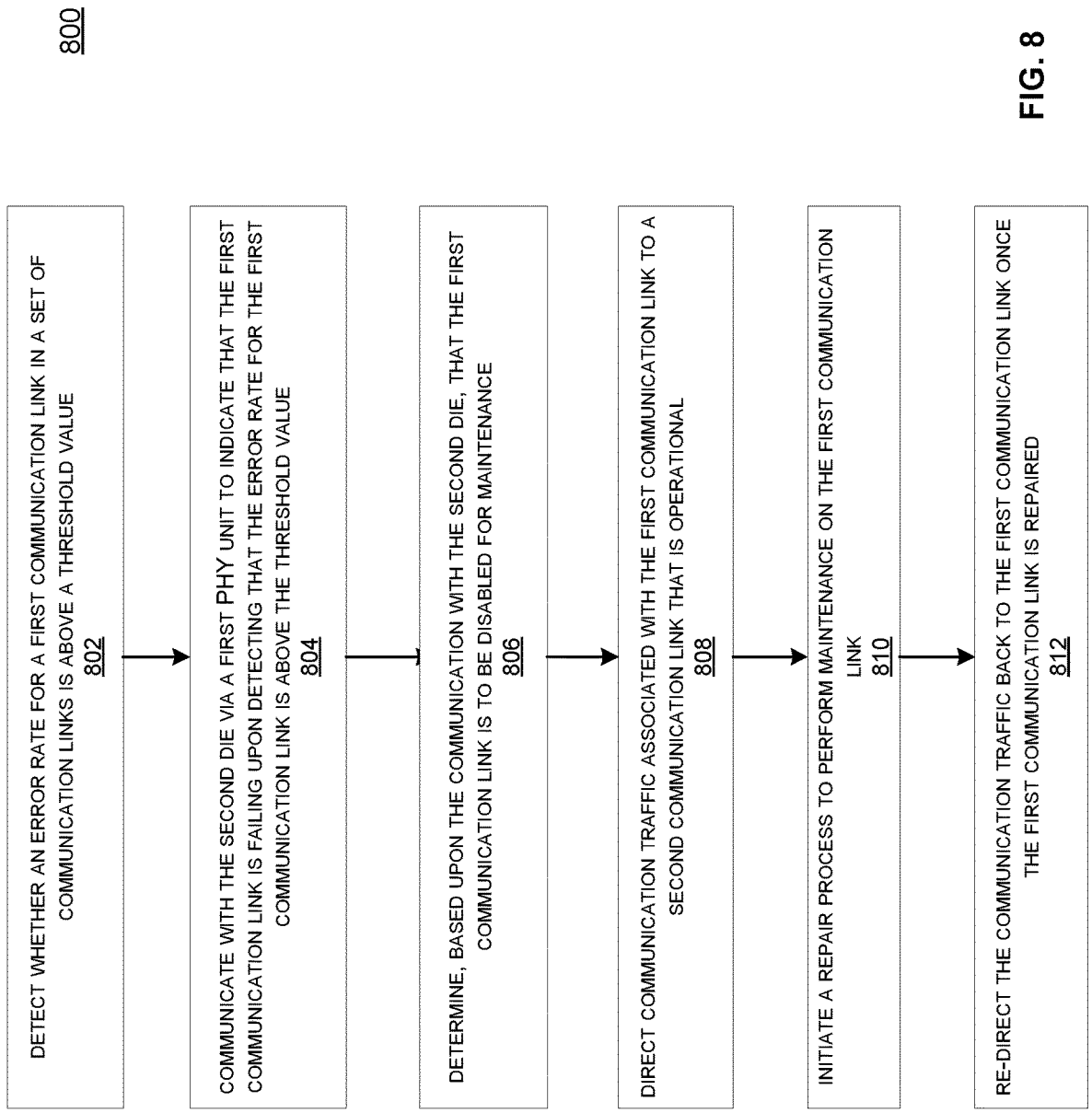
FIG. 8 illustrates a flow chart for a method executed by a system to perform autonomous link management, according to certain embodiments.

FIG. 8 illustrates a flow chart 800 for a method executed by a system to perform autonomous link management, according to certain embodiments. The method may be performed by the detection unit and the controller of the link management unit, which can be part of a first die along with a first PHY unit. The first die may be configured to communicate with a second die using a set of communication links. As an example, the link management unit can be the first link management unit 202 discussed with reference to FIG. 2A or 2B. The first PHY unit can be any SERDES PHY unit from the SERDES PHY units 108_1-108_M.

In step 802, the method may include detecting, by a detection unit, whether an error rate for a first communication link in a set of communication links is above a threshold value (e.g., whether the quality of the first communication link satisfies a quality metric). The detection unit may be coupled to a first controller and a first PHY unit on a first die. The first die may be configured to communicate with a second die using the set of communication links. For example, the first detection unit 204 (or the first detection unit 204_1) on the first die 102 may detect whether the error rate for the first communication link (e.g., link1) from the M links is above a threshold value. As discussed with reference to FIG. 3, the link monitor unit 302 may calculate the error rate by performing statistical calculations in real time by keeping a count of the discarded packets over each link within a pre-determined time period.

In step 804, the method may further include communicating, by a first controller, with the second die via the first PHY unit to indicate that the first communication link is failing based upon detecting that the error rate for the first communication link is above the threshold value. Communicating with the second die may include sending a control packet to the second link management unit indicating that the one or more communication links are failing and receiving an acknowledgement packet from the second link management unit with an acknowledgement that the first communication link is to be disabled for maintenance. For example, the link monitor unit 302 may determine that the quality of link1 doesn't satisfy a quality metric when the error rate for link1 exceeds the threshold value. The first controller 204 may communicate with the second controller 214 via any of the SERDES PHY units 108_1-108_M to indicate that link1 is failing based on the link status signal received from the first detection unit 204. Communicating with the second die 104 may include sending a first control packet to the second link management unit 210 indicating that link1 is failing and receiving a first acknowledgement packet from the second link management unit 210 with an acknowledgement that link1 is to be disabled for maintenance.

In certain examples, the link monitor unit 302 for each link may determine that more than one links are failing based on respective error rates for the failing links, and indicate in the respective link status signal to the first controller 204 that link1 and link3 are failing. The first controller 204 may communicate with the second controller 214 to indicate that link1 and link3 are failing based on the link status signal(s) received from the first detection unit 204

(or the first detection units 204_1 and 204_3). For example, the first control packet may include the link IDs for both link1 and link3.

In step 806, the method may further include determining, by the first controller, based upon the communication with the second die, that the first communication link is to be disabled for maintenance. For example, the second link management unit 210 may determine that link1 can be disabled prior to disabling link3 for maintenance. In certain examples, the second link management unit 210 may determine that link1 can be disabled prior to disabling link3 based upon the type of the communication traffic carried by link1. For example, in certain instances, link1 can carry mission critical traffic and failure of link1 can be catastrophic. In other instances, the link with the lower quality can be disabled first for maintenance.

In step 808, the method may further include directing, by the first controller, communication traffic associated with the first communication link to a second communication link that is operational. As an example, the first controller 206 may identify link2 from one or more operational links for carrying the traffic of link1 based on the quality of the links, available bandwidth, type of communication traffic, or any other criteria based on the link status signals. The first controller 206 may direct the communication traffic of link1 to link2 in synchronization with the second controller 214. Once the communication traffic for link1 switches to link2, the first detection unit 204 may initiate the repair process to repair link1. In certain examples, the first controller 206 may direct the communication traffic of link1 to more than one operational links in synchronization with the second controller 214.

In step 810, the method may further include initiating a repair process to perform maintenance on the first communication link. The repair process may include sending a request to the SERDES PHY unit, which is coupled to the first communication link, to reset and re-calibrate the first communication link. The request can be sent by the first detection unit 204 or the first controller 206. For example, the repair process may include sending a request to the SERDES PHY unit 108_1, which is coupled to link1, to reset and re-calibrate link1. Once the SERDES PHY unit 108_1 has reset and re-calibrated link1, the SERDES PHY unit 108_1 may send a signal to the first controller 206 indicating that link1 has been repaired or the re-calibration of link1 has completed.

In step 812, the method may further include re-directing, by the first controller, the communication traffic back to the first communication link once the first communication link is repaired. The first controller 206 may re-direct the communication traffic back to link1 in synchronization with the second controller 214. The first controller 206 may send a second control packet to the second controller 214 indicating that link1 is repaired, and receive a second acknowledgement packet from the second controller 214 with an acknowledgement of receipt of the second control packet. The first controller 206 may re-direct the communication traffic back to link1 upon receiving the second acknowledgement packet. In certain embodiments, the steps 802-812 can be performed in parallel by each controller for multiple failing links based on the available bandwidth and number of operational links.

As discussed with previous figures, embodiments can be used to provide autonomous link management of all the SERDES links in a multi-die assembly using a hardware detection unit and a controller on each die. One or more detection units can continuously measure the quality of each link and communicate with the controller when the error rate goes above a threshold value for a failing link. The controllers on both the dice can negotiate to disable the failing link without impacting the flow of traffic. The controller can direct the traffic from the failing link to an operational link before the failing link goes down for maintenance in order to provide continuous operation. Once the failing link is repaired, the controller can re-direct the traffic back to the repaired link in synchronization with the other controller. Thus, management of the links in hardware can provide a continuous flow of traffic without compromising the system performance.

Figure 9:
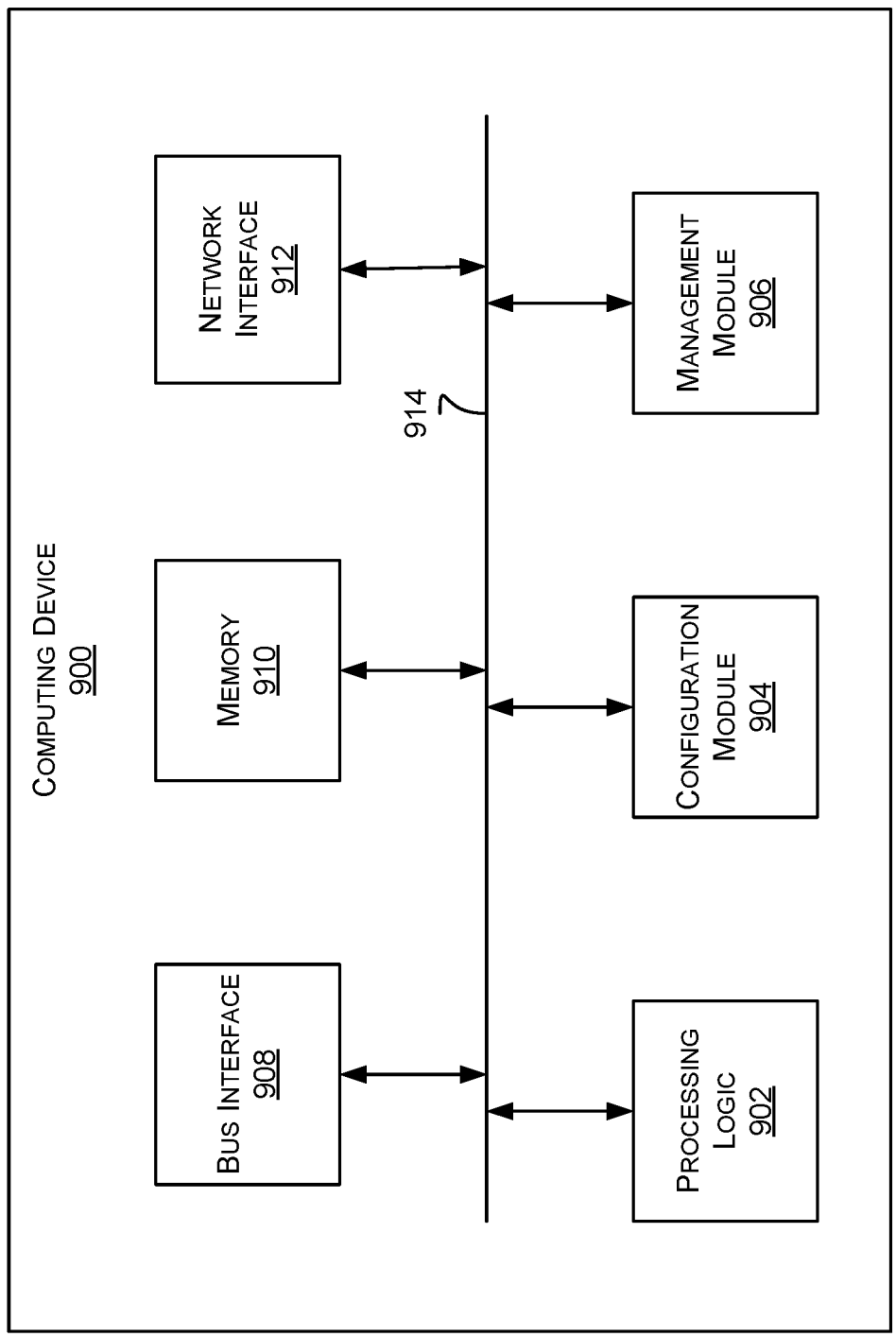
FIG. 9 illustrates an example of a network device, according to certain aspects of the disclosure.

FIG. 9 illustrates an example of a computing device 900. Computing device 900 or a combination of its components can be implemented using one or more dice integrated in a multi-chip assembly. In some implementations, computing device 900 may act as a network device.

Functionality and/or several components of the computing device 900 may be used without limitation with other embodiments disclosed elsewhere in this disclosure, without limitations. A computing device 900 may facilitate processing of packets and/or forwarding of packets from the computing device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 900 may be the recipient and/or generator of packets. In some implementations, the computing device 900 may modify the contents of the packet before forwarding the packet to another device. The computing device 900 may be a peripheral device coupled to another computer device, a switch, a router or any other suitable device enabled for receiving and forwarding packets.

In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules which are not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel. In certain examples, one or more modules of the computing device 900 (e.g., processing logic 902) can be on the first die 102 and some other modules of the computing device 900 (e.g., memory 910) can be on the second die 104, and the communication channel 914 may include SERDES links as discussed with reference to FIG. 2.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A multi-die assembly, comprising:
   a first die comprising a first detection unit, a first controller, and a first set of M Serializer/De-serializer (SERDES) units; and
   a second die comprising a second detection unit, a second controller, and a second set of M SERDES units, each SERDES unit in the first set of M SERDES units coupled to a corresponding SERDES unit in the second set of M SERDES units via a respective communication link from a set of M communication links,
   the first detection unit configured to:
      detect whether an error rate for communication traffic on a first communication link is higher than a threshold value; and
      upon detecting that the error rate for the communication traffic on the first communication link is higher than the threshold value, send a first link status signal to the first controller indicating that the first communication link is failing; and
   the first controller configured to:
      upon receiving the first link status signal, send, via a SERDES unit from the first set of M SERDES units, a first control packet to the second controller indicating that the first communication link is failing;
      determine, based upon an acknowledgement packet sent from the second controller in response to the first control packet, that the first communication link is to be disabled for maintenance;
      select, from among one or more communication links that remain operational, a second communication link for replacing the first communication link;
      direct, based upon the acknowledgement packet confirming an agreement between the first controller and the second controller to use the second communication link instead of the first communication link, the communication traffic associated with the first communication link to the second communication link, wherein the acknowledgement packet includes a link identifier for the first communication link and a link identifier for the second communication link, wherein the link identifier for the first communication link indicates that the second controller agrees to disable the first communication link, and wherein the link identifier for the second communication link indicates that the second controller agrees to use the second communication link instead of the first communication link;
      send a request to a first SERDES unit coupled to the first communication link to repair the first communication link;
      determine that the first communication link is repaired based on a status signal received from the first SERDES unit;
      upon receiving the status signal that the first communication link is repaired, communicate, via the SERDES unit from the first set of M SERDES units, with the second controller indicating that the first communication link is repaired; and
      re-direct, based upon the communication with the second controller, the communication traffic back to the first communication link.

2. The multi-die assembly of claim 1, wherein the first die comprises M detection units including the first detection unit, each detection unit coupled to a corresponding SERDES unit from the first set of M SERDES units to monitor quality of the respective communication link from the M communication links, wherein the first detection unit from the M detection units monitors the quality of the first communication link by determining the error rate for the communication traffic on the first communication link.

3. The multi-die assembly of claim 1, wherein the first link status signal includes the link identifier for the first communication link, and a status to indicate that the first communication link is failing.

4. The multi-die assembly of claim 1, wherein the first controller communicates with the second controller via the first SERDES unit from the first set of M SERDES units.

5. A system comprising:
a first die comprising a first link management unit and a first PHY unit, the first die configured to communicate with a second die using a set of communication links, and the first link management unit comprising a first detection unit and a first controller, wherein the first link management unit is configured to:
detect, using the first detection unit, whether a quality of a first communication link in the set of communication links satisfies a quality metric;
upon detecting that the quality of the first communication link does not satisfy the quality metric, send, by the first controller and via the first PHY unit, a first communication to a second controller in the second die to indicate that the first communication link is failing;
determine, by the first controller and based on a second communication sent from the second controller in response to the first communication, that the first communication link is to be disabled for maintenance;
direct, by the first controller and based on an acknowledgement packet confirming an agreement between the first controller and the second controller to use a second communication link instead of the first communication link, communication traffic associated with the first communication link to the second communication link, wherein:
the acknowledgement packet includes a link identifier for the first communication link and a link identifier for the second communication link,
the link identifier for the first communication link indicates that the second controller agrees to disable the first communication link,
the link identifier for the second communication link indicates that the second controller agrees to use the second communication link instead of the first communication link,
the second communication link is selected from among one or more communication links that remain operational, and
the acknowledgement packet is included in the second communication or a subsequent communication from the second controller;
initiate a repair process to perform maintenance on the first communication link; and
re-direct, by the first controller, the communication traffic back to the first communication link once the first communication link is repaired.

6. The system of claim 5, wherein the second die comprises a second link management unit, the second link management unit comprises a second detection unit and the second controller, and wherein:
the first communication comprises a control packet indicating that the first communication link is failing; and the second communication is received via the first PHY unit.

7. The system of claim 6, wherein the control packet comprises the link identifier for the first communication link and a status identifier for the first communication link, and wherein the status identifier for the first communication link indicates a failing status.

8. The system of claim 6, wherein the second die further comprises a second PHY unit, and wherein the second link management unit is configured to:
receive, via the second PHY unit, the control packet from the first link management unit; and
send, via the second PHY unit, the acknowledgement packet to the first link management unit.

9. The system of claim 6, wherein the first link management unit is further configured to communicate with the second die to indicate that a third communication link in the set of communication links is failing around a same time as the first communication link, and wherein the second link management unit is configured to determine that the first communication link is to be disabled prior to disabling the third communication link based upon communication traffic carried by the first communication link being of higher priority than communication traffic carried by the third communication link.

10. The system of claim 6, wherein the first link management unit is further configured to communicate with the second die to indicate that a third communication link in the set of communication links is failing around a same time as the first communication link, and wherein the second link management unit is configured to determine that the first communication link is to be disabled prior to disabling the third communication link based upon a quality of the first communication link being worse than a quality of the third communication link.

11. The system of claim 5, wherein the first PHY unit is part of a set of PHY units coupled to the set of communication links, respectively, and wherein initiating the repair process includes:
sending a request to a PHY unit from the set of PHY units, which is coupled to the first communication link, to reset and re-calibrate the first communication link.

12. The system of claim 11, wherein the first link management unit is further configured to determine that the first communication link is repaired based upon receiving a signal from the PHY unit indicating that the re-calibration of the first communication link has completed.

13. The system of claim 5, wherein the quality metric includes an error rate that is calculated based on a count of discarded packets in a pre-determined time period.

14. The system of claim 13, wherein the first link management unit is further configured to:
upon detecting that a packet being received contains an error, send a request to the second die to resend the packet.

15. The system of claim 5, wherein the second die comprises a second link management unit, the second link management unit comprises a second detection unit and the second controller, and wherein the first link management unit is further configured to:
send, via the first PHY unit, a control packet to the second link management unit indicating that the first communication link is repaired; and
receive, via the first PHY unit, a second acknowledgement packet from the second link management unit with an acknowledgement of receipt of the control packet, wherein the first link management unit is configured to re-direct the communication traffic back to the first communication link after receiving the second acknowledgement packet.

16. The system of claim 5, wherein the second communication link is a spare communication link that is normally not used to carry the communication traffic.

17. A method comprising:
  detecting, by a detection unit, whether an error rate of a first communication link in a set of communication links is above a threshold value, the detection unit coupled to a first controller and a first PHY unit on a first die, the first die configured to communicate with a second die using the set of communication links;
  sending, by the first controller and via the first PHY unit, a first communication to a second controller in the second die to indicate that the first communication link is failing based upon detecting that the error rate of the first communication link is above the threshold value;
  determining, by the first controller and based on a second communication sent from the second controller in response to the first communication, that the first communication link is to be disabled for maintenance;
  directing, by the first controller and based on an acknowledgement packet confirming an agreement between the first controller and the second controller to use a second communication link instead of the first communication link, communication traffic associated with the first communication link to the second communication link, wherein:
    the acknowledgement packet includes a link identifier for the first communication link and a link identifier for the second communication link,
    the link identifier for the first communication link indicates that the second controller agrees to disable the first communication link,
    the link identifier for the second communication link indicates that the second controller agrees to use the second communication link instead of the first communication link,
    the second communication link is selected from among one or more communication links that remain operational, and
    the acknowledgement packet is included in the second communication or a subsequent communication from the second controller;
  initiating, by the first controller, a repair process to perform maintenance on the first communication link; and
  re-directing, by the first controller, the communication traffic back to the first communication link once the first communication link is repaired.

18. The method of claim 17, wherein:
  the first communication comprises a control packet indicating that the first communication link is failing; and
  the second communication is received via the first PHY unit.

19. The method of claim 17, wherein the first PHY unit is part of a set of PHY units coupled to the set of communication links, respectively, and wherein initiating the repair process includes:
  sending, by the first controller, a request to a PHY unit from the set of PHY units, which is coupled to the first communication link, to reset and re-calibrate the first communication link.

20. The method of claim 19, wherein the method further comprises:
  determining, by the first controller, that the first communication link is repaired based on receiving a signal from the PHY unit indicating that the re-calibration of the first communication link has completed;
  sending, by the first controller via the first PHY unit, a control packet to the second controller indicating that the first communication link is repaired; and
  receiving, by the first controller via the first PHY unit, a second acknowledgement packet from the second controller with an acknowledgement of receipt of the control packet,
  wherein re-directing, by the first controller, the communication traffic back to the first communication link is performed upon receiving the second acknowledgement packet from the second controller.

* * * * *